W. F. CHASE.
MACHINE FOR MAKING GLASS BEADS.
APPLICATION FILED APR. 19, 1920.
1,391,527.
Patented Sept. 20, 1921.
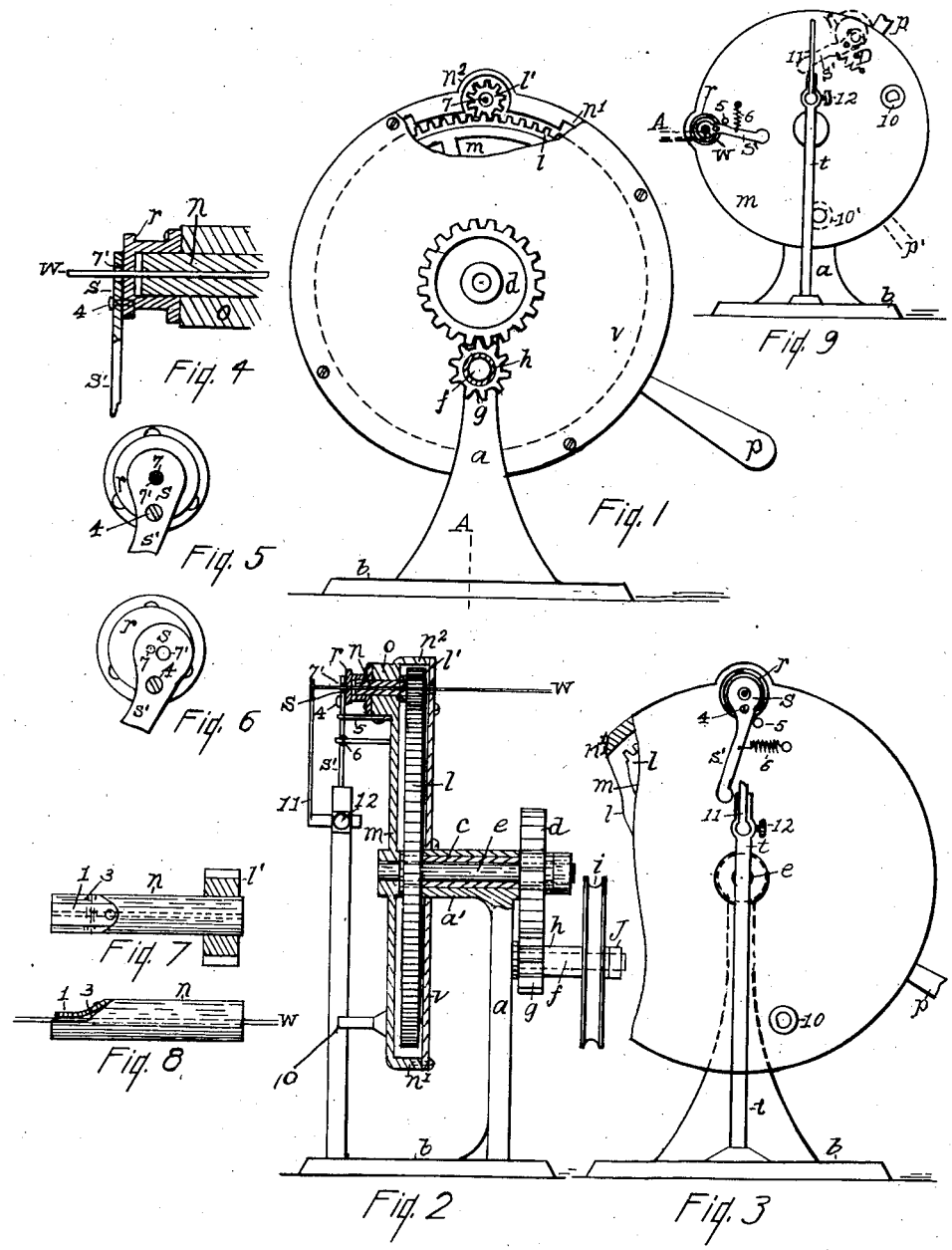

UNITED STATES PATENT OFFICE.

WILLIAM F. CHASE, OF PEEKSKILL, NEW YORK.

MACHINE FOR MAKING GLASS BEADS.

1,391,527.   Specification of Letters Patent.   Patented Sept. 20, 1921.

Application filed April 19, 1920. Serial No. 374,846.

*To all whom it may concern:*

Be it known that I, WILLIAM F. CHASE, a citizen of the United States, and resident of Peekskill, in the county of Westchester and State of New York, have invented certain new and useful Improvements in Machines for Making Glass Beads, of which the following is a specification.

This invention relates to the making of glass beads, and its object is to provide a machine for the purpose that shall make a more perfect production, with a saving of time and labor. The objects are attained by the means set forth in this specification and the accompanying drawings, in both of which like letters and numbers refer to similar parts throughout the several views.

Figure 1 is an elevation of the rear side of the machine, partly in section. Fig. 2 is a vertical section through the machine through line C of Fig. 1. Fig. 3 is a front elevation representing one side cut away. Fig. 4 is a longitudinal section of part of the beading spindle and cutting off devices. Figs. 5 and 6 are enlarged views of the cutting off devices. Figs. 7 and 8 are enlarged views of the beading spindle. Fig. 9 is to illustrate how the machine is to be operated.

The machine comprises a standard $a$, Figs. 1, 2 and 3, on a base $b$, with two shafts $c$ and $e$, one within the other, supported in the bearing $a'$ of the standard, see Fig. 2. Upon the shaft $c$ is a spur gear wheel $d$, and upon a stud $f$, secured in the standard, is a pinion $g$ that engages with the wheel $d$. The pinion is fast on the hollow shaft $h$ that runs on the stud, and a belt-driven pulley $i$ is fast on the shaft. The shaft is held to the stud by the collar $j$.

Upon the inner end of the hollow shaft $c$ is a spur gear wheel $l$ that is driven through the shaft by the gears just described. Upon the inner end of the solid shaft $e$ a disk $m$ is secured. This disk is flanged to inclose the periphery of the gear wheel. As at $o$ the disk is thickened to receive a beading spindle $n$, on which is a gear pinion $l'$ engaging with the wheel $l$. The flange on the disk is extended as at $n^2$ to inclose the pinion. The spindle $n$ has a hole through its longitudinal center to receive the wire on which the bead is to be formed. A handle $p$ is attached to the disk to be controllable by hand, while the beading spindle has a continuous motion imparted to it through the gearing. To the inner edge of the flange $n^1$ $n^2$ a plate $v$ is secured, so that the gear wheels $l$ and $l'$ are entirely incased between the disk and plate.

The beading spindle $n$ is shown in enlarged detail in Figs. 7 and 8. The hole through the center of the spindle is adapted to easily receive the wire to be used, so the wire can be pushed through easily. To hold the wire firmly while the bead is being made thereon, the simple expedient is shown of flattening a portion of the spindle, as at 3, in the figures, to uncover a part of the wire diametrically, and attaching a spring 1 so it will rest elastically upon the wire as in Fig. 8; like a finger pressure. Not much pressure is required, and there is no lateral pressure on the wire. Obviously, any kind of chuck that will answer the same purpose can be employed.

To cut off the wire after the bead is formed thereon, a cutting means is shown in enlarged detail in Figs. 4, 5 and 6. A die piece $r$ is fitted over the projecting end of the beading spindle and is secured to the disk, as in Figs. 2, 3 and 4. The hole in the die corresponds with, and is alined with the hole in the spindle. A shearing lever $s$ $s'$ is pivoted to the die, as at 4, Figs. 5, 6, a hole in it corresponding with the hole in the die. The normal position of the lever is shown in Fig. 3. A stop 5 projecting from the disk $m$ holds the long arm $s'$ of the lever, so that the holes in the die and lever are co-incident, as in Figs. 3 and 5. A spring 6, see Fig. 3 holds the lever against the stop. A post $t$, secured in the base $b$, is of such height as to trip the lever at a proper point, carrying the shearing end of the lever to the position shown in Fig. 5. The end of the lever will not pass beyond the post, as the movement of the disk in the direction that might effect that result is limited so as to prevent it, by means of a stop shown in Fig. 9 in full lines at 10 and in dotted outline at 10' when shifted and secured to the disk to engage with the post, as in Figs. 1, 2 and 3.

After cutting off a bead the wire W has to be pushed a suitable distance through the spindle for the next bead. The cutting off of the beaded wire will be effected after the beading spindle has passed a point vertically over the tripping post, so that it is admissible to attach an adjustable gage, as 11, to the post, as in Figs. 2, 3 and 9, to extend to a point opposite the wire when the beading spindle is in line with the gage, and the gage regulates the length of the wire.

Fig. 9 is introduced to show the operation of the machine. A rod of glass is indicated by the broken lines A. Such a rod is supported upon suitable standards, and a jet of flame is projected against the glass and keeps it in a plastic state. The machine being set in motion, the beading spindle will be kept in continuous rotation. By turning the disk by the handle the wire W is carried down to the glass and in contact therewith, and the glass adheres to the revolving wire, assuming a globular form. When a sufficient amount of glass is wound on the wire the handle is slowly depressed, drawing the globule from the mass. By the time the bead reaches the cutting off point, indicated at D, the bead will be hard, when the wire will be cut and the globule or bead will fall upon a chute to be carried to a receptacle. After the cutting off the beading spindle will be turned to opposite the gage, and a length of wire for the next bead will be pushed forward by the operator, and the motions as before will be repeated. The only movements required of the operator of the machine, are to manipulate the handle with the left hand and the wire and the glass rod with the other hand.

What is herein described as a "disk" is so made for symmetry and to obtain a convenient casing for the gears that immediately actuate the beading spindle. Obviously, a skeleton frame can be made to serve the same operative results, and therefore it is preferably called a "frame" in practice, and in the claims.

Having described the invention, what is claimed and desired to be secured by Letters Patent, is—

1. A machine for forming glass beads comprising a shaft bearing supported on a standard with a base, a hollow shaft in the bearing and a solid shaft to run in the hollow shaft, means to drive the hollow shaft, a spur gear wheel on the outer end of the hollow shaft, a disk frame on the solid shaft adjacent to the said spur gear wheel, a hollow spindle in the frame and a gear pinion on said spindle engaging with the said spur wheel, a handle on the frame, cutting off means attached to the frame adjacent to said spindle comprising a die and cutting off lever, a post adjacent to the frame, fast to the base, for tripping the cutting off lever, a stop on the frame to contact with said post, and an adjustable gage in the top of said post.

2. In a machine for making glass beads comprising a continually revolving spur wheel, a frame adjacent to the spur wheel rotatable on a center co-incident with the center of the spur wheel, the frame carrying a hollow beading spindle, a pinion on said spindle engaging with said spur wheel, and a handle on the frame, cutting off means comprising a die piece attached to said frame at the end of the beading spindle the die hole alined with the hole in the spindle, a cutting off lever pivoted on the die its cutting end against the die and a hole in it co-incident with the hole in the die, and a fixed means for tripping the lever at a given point.

3. In a machine for making glass beads the combination with a continuously revolving gear wheel, of a frame adjacent to said wheel rotatable on a center co-incident with that of said gear wheel, the frame carrying a spindle and a pinion on the spindle engaged with the said spur wheel, the spindle provided with a hole through its center, and a handle on the frame for turning the said hollow spindle toward and from the glass that forms the beads.

4. In a machine for forming glass beads the combination of a shaft bearing, a standard and base supporting the bearing, a hollow shaft in the bearing and a solid shaft to turn in the hollow shaft, means to drive the hollow shaft, a spur gear wheel on the outer end of the hollow shaft, a disk frame on the solid shaft adjacent to the said spur wheel, a hollow beading spindle in the disk frame and a gear pinion on said spindle engaging with the spur wheel, a handle on the frame, a flange on the frame projecting over the said gear wheels and a plate secured to the reverse edges of the flange.

Signed at Peekskill, in the county of Westchester and State of New York, this 8th day of April A. D. 1920.

WILLIAM F. CHASE.